(12) United States Patent
Nagatsuka

(10) Patent No.: US 9,694,501 B2
(45) Date of Patent: Jul. 4, 2017

(54) PARALLEL LINK ROBOT

(71) Applicant: THK CO., LTD., Tokyo (JP)

(72) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 277 days.

(21) Appl. No.: 14/362,512

(22) PCT Filed: Nov. 29, 2012

(86) PCT No.: PCT/JP2012/080927
§ 371 (c)(1),
(2) Date: Jun. 3, 2014

(87) PCT Pub. No.: WO2013/084788
PCT Pub. Date: Jun. 13, 2013

(65) Prior Publication Data
US 2014/0331806 A1     Nov. 13, 2014

(30) Foreign Application Priority Data

Dec. 7, 2011 (JP) .................................. 2011-267888

(51) Int. Cl.
*B25J 18/00* (2006.01)
*B25J 9/00* (2006.01)

(52) U.S. Cl.
CPC ............. *B25J 18/00* (2013.01); *B25J 9/0051* (2013.01); *Y10S 901/19* (2013.01); *Y10T 74/20305* (2015.01)

(58) Field of Classification Search
CPC ................................. B25J 9/0051; B25J 18/00
USPC ................ 74/490.01, 490.05; 901/16, 18, 23
See application file for complete search history.

(56) References Cited

U.S. PATENT DOCUMENTS

| 4,300,362 A | * | 11/1981 | Lande | ...................... | B23Q 1/50 |
| | | | | | 414/1 |
| 4,712,441 A | * | 12/1987 | Abraham | ............ | F16H 25/2015 |
| | | | | | 74/412 TA |

(Continued)

FOREIGN PATENT DOCUMENTS

| DE | 10 2010 009 447 A1 | 8/2011 |
| JP | 63-501860 A | 7/1988 |

(Continued)

OTHER PUBLICATIONS

Extended European Search Report dated Sep. 22, 2015, issued in counterpart European Patent Application No. 12856546.2 (5 pages).

(Continued)

*Primary Examiner* — William C Joyce
(74) *Attorney, Agent, or Firm* — Westerman, Hattori, Daniels & Adrian, LLP

(57) ABSTRACT

Provided is a parallel link robot which has increased rigidity and which can be reduced in size. The parallel link robot includes: a base (1); a movable portion (2); a plurality of link portions (5) connecting the base (1) and the movable portion (2); and a plurality of actuators (6) for driving the plurality of link portions (5), wherein each of the plurality of actuators (6) is a linear actuator (6) supported on the base (1) to be rotatable about a predetermined axis (A1) and has a main body portion (8) and a shaft portion (7) for linearly moving relative to the main body portion (8), and each of the plurality of link portions (5) has a driving link (3) supported on the base (1) to be rotatable about a predetermined axis (A2) and connected to the linear actuator (6) and a driven link (4) connecting the driving link (3) and the movable portion (2). When the linear actuator (6) extends and contracts, the driving link (3) rotates relative to the base (1) about the predetermined axis (A2) of the driving link (3).

4 Claims, 4 Drawing Sheets

(56) References Cited

U.S. PATENT DOCUMENTS

| | | | | |
|---|---|---|---|---|
| 5,378,282 | A * | 1/1995 | Pollard | B05B 13/0431 118/323 |
| 6,418,811 | B1 * | 7/2002 | Rosheim | B25J 17/0266 414/729 |
| 8,272,290 | B2 * | 9/2012 | Zhang | B25J 9/107 74/490.01 |
| 8,418,579 | B2 * | 4/2013 | Zhang | B25J 17/0266 74/490.01 |
| 8,424,411 | B2 * | 4/2013 | Long | B25J 9/0051 74/490.05 |
| 8,429,998 | B2 * | 4/2013 | Feng | B25J 17/0266 74/490.1 |
| 8,516,917 | B2 * | 8/2013 | Zhao | B25J 17/0266 74/490.01 |
| 8,516,919 | B2 * | 8/2013 | Feng | B25J 17/0266 74/490.05 |
| 8,596,159 | B2 * | 12/2013 | Zhang | B25J 9/102 74/490.01 |
| 2002/0166404 | A1 | 11/2002 | Rosheim | |
| 2008/0262653 | A1 | 10/2008 | Arakelyan et al. | |
| 2011/0291433 | A1 * | 12/2011 | Feng | B25J 17/0266 294/65 |

FOREIGN PATENT DOCUMENTS

| | | |
|---|---|---|
| JP | 02-160495 A | 6/1990 |
| JP | 03-65686 U | 6/1991 |
| JP | 07-088917 A | 4/1995 |
| JP | 08-011080 A | 1/1996 |
| JP | 09-001491 A | 1/1997 |
| JP | 09-136286 A | 5/1997 |
| JP | 11-058286 A | 3/1999 |
| JP | 11-104987 A | 4/1999 |
| JP | 2000-110905 A | 4/2000 |
| JP | 2000-130534 A | 5/2000 |
| JP | 2011-230241 A | 11/2011 |
| WO | 87/03528 A1 | 6/1987 |
| WO | 2007/034561 A1 | 3/2007 |
| WO | 2011/114723 A1 | 9/2011 |

OTHER PUBLICATIONS

Chinese Office Action dated Mar. 17, 2015, issued in CN Patent Application No. 201280059881.3 with English translation (9pages).
International Search Report, dated Mar. 5, 2013, issued in corresponding application No. PCT/JP2012/080927.

* cited by examiner

PARALLEL LINK ROBOT

TECHNICAL FIELD

The present invention relates to a parallel link robot in which a plurality of link portions are arranged between a base and a movable portion and the movable portion is moved by driving the plurality of link portions with a plurality of actuators.

BACKGROUND ART

A parallel link robot is a robot in which a plurality of link portions are arranged between abase and a movable portion. By driving the plurality of link portions with the plurality of actuators, a position or a position and an attitude of the movable portion is/are changed. As types of the parallel link robot, there are an extendable parallel link robot, a rotary parallel link robot, and a linear parallel link robot.

The extendable parallel link robot was proposed the earliest and is used for aircraft simulators, play facilities, and the like. The extendable parallel link robot is formed by arranging six extendable links between a base and a movable portion. By changing link lengths of the extendable links, the movable portion is caused to perform translational movements in directions of three axes, i.e., an x-axis, a y-axis, and a z-axis and an attitude of the movable portion is caused to rotate about the three axes, i.e., the x-axis, the y-axis, and the z-axis (refer to Patent Literature 1).

For the rotary parallel link robot, rotary actuators are used as drive sources. As a typical example of the rotary parallel link robot, there is a known device in which a base is formed in a triangular shape, three motors are mounted to respective sides of the triangular shape of the base in such a manner that output shafts of the motors are parallel to the respective sides, thin and long arms rotating about the output shafts of the respective motors are integrally connected to the output shafts, and tip ends of the respective arms and the movable portion are connected by links (refer to Patent Literature 2). By driving the three arms connected to the output shafts of the three motors for rotation, the movable portion is caused to perform translational movements in directions of three axes, i.e., an x-axis, a y-axis, and a z-axis relative to the base. If six motors, arms, and links are provided, it is possible to achieve not only the translational movements of the movable portion in the directions of the three axes, i.e., the x-axis, the y-axis, and the z-axis but also rotation of an attitude of the movable portion about the three axes, i.e., the x-axis, the y-axis, and the z-axis.

For the linear parallel link robot, linear actuators are used as drive sources. As a typical example of the linear parallel link robot, there is a known mechanism in which six guides are radially fixed to a base at predetermined angles, sliding tables to be driven by ball screws are mounted to the respective guides to be able to move linearly, and the sliding tables of the respective guides and the movable portion are connected by rods (refer to Patent Literature 3). By linearly moving the sliding tables of the six guides, the movable portion can be caused to perform translational movements in directions of three axes, i.e., an x-axis, a y-axis, and a z-axis and an attitude of the movable portion can be changed about the three axes, i.e., the x-axis, the y-axis, and the z-axis.

CITATION LIST

Patent Literatures

Patent Literature 1: JP 2000-130534 A
Patent Literature 2: JP 63-501860 W
Patent Literature 3: JP 11-104987 A

SUMMARY OF INVENTION

Technical Problem

However, the above extendable parallel link robot, the rotary parallel link robot, and the linear parallel link robot have the following advantages and disadvantages.

The extendable parallel link robot has advantages that high output can be achieved and that rigidity of the parallel link robot is high, because all the extendable links between the base and the movable portion are arranged in parallel. However, the extendable parallel link robot has a disadvantage that a range of movement of the movable portion is narrow.

The rotary parallel link robot has an advantage that a range of movement of the movable portion is broad, because the arms and the links connected to the output shafts of the motors move the movable portion. However, the rotary parallel link robot has disadvantages that resistance force of the motors is small when an external force acts on the movable portion and that rigidity of the parallel link robot is low. If the motor is increased in size in order to increase the rigidity of the parallel link robot, the parallel link robot is increased in size.

The linear parallel link robot has an advantage that the movable portion can be positioned with high accuracy. However, the linear parallel link robot has a disadvantage that since all the external force acts on the movable portion, the linear actuators are required of high rigidity, which results in increase in size of the linear actuators and eventually results in increase in size of the parallel link robot. Moreover, the linear parallel link robot has a disadvantage that it requires linear guides in order to secure rigidity.

The present invention solves the disadvantages of the above prior-art parallel link robots and its object is to provide a parallel link robot which has increased rigidity and which can be reduced in size.

Solution to Problem

To solve the above problem, an aspect of the present invention provides a parallel link robot including: a base; a movable portion; a plurality of link portions connecting the base and the movable portion; and a plurality of actuators for driving the plurality of link portions, wherein each of the plurality of actuators is a linear actuator supported on the base to be rotatable about a predetermined axis and has a main body portion and a shaft portion for linearly moving relative to the main body portion, each of the plurality of link portions has a driving link supported on the base to be rotatable about a predetermined axis and connected to the linear actuator and a driven link connecting the driving link and the movable portion, and, when the linear actuator extends and contracts, the driving link rotates relative to the base about the predetermined axis of the driving link.

Advantageous Effects of Invention

According to an aspect of the invention, each of the linear actuators and each of the driving links are supported on the base to be rotatable about the predetermined axis. By extending and contracting the linear actuator, the driving link rotates about the predetermined axis. Therefore, an external force applied to the movable portion is converted into a force in the direction of a center line of the linear actuator and acts on the linear actuator. Because the linear actuator can bear the large external force applied to the movable portion in the direction of the center line, rigidity of the parallel link robot increases. Moreover, because the driving link is supported on the base to be rotatable about the predetermined axis, part of the external force applied to the movable portion can be received by the base. By the part of the external force applied by the movable portion, received by the base, the external force acting on the linear actuator reduces and therefore it is possible to reduce the linear actuator in size and eventually the entire parallel link robot in size.

BEST MODE FOR CARRYING OUT THE INVENTION

Figure 1:
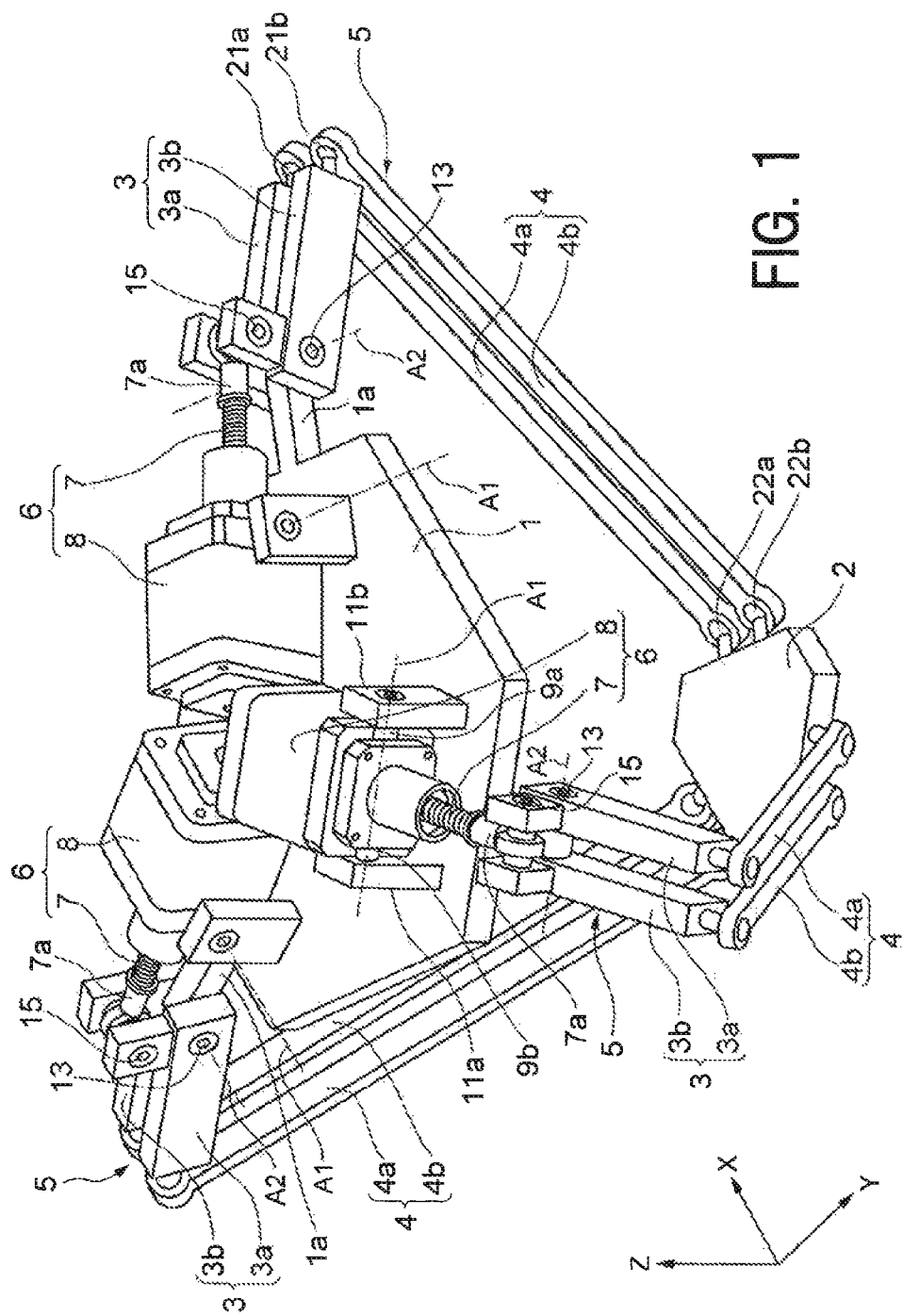
FIG. 1 illustrates a perspective view of a parallel link robot according to an embodiment of the present invention.
Figure 2:
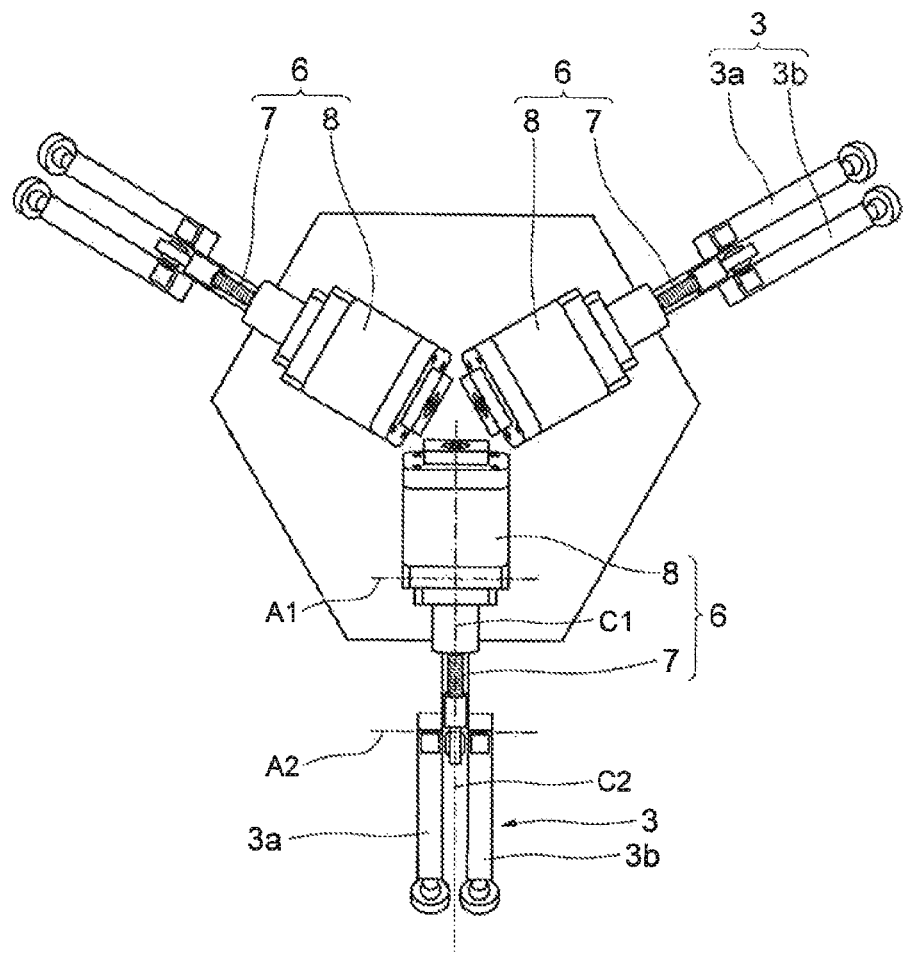
FIG. 2 illustrates a plan view of the parallel link robot.
Figure 3:
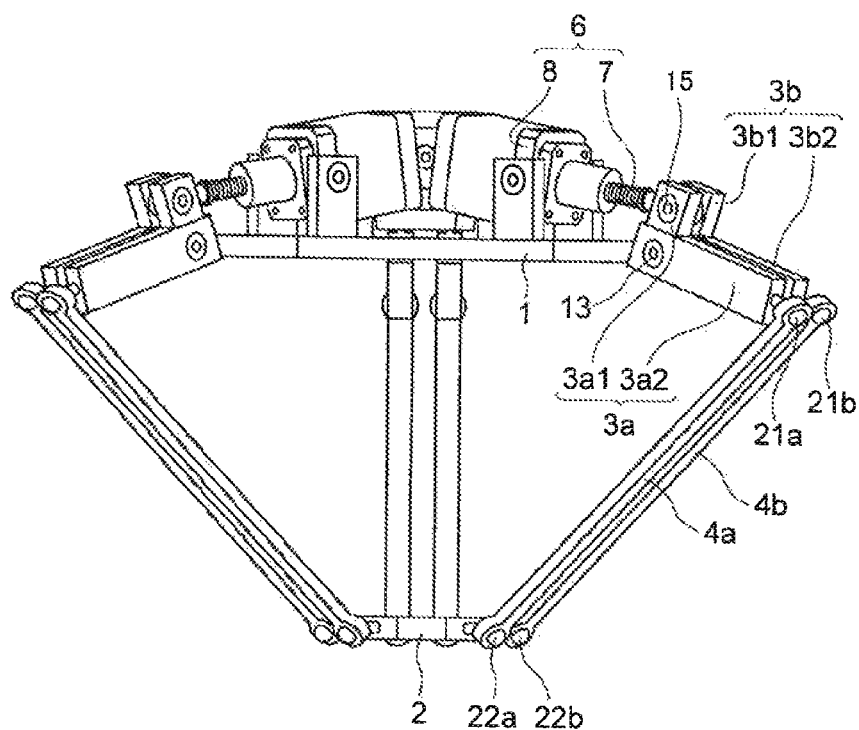
FIG. 3 illustrates a side view of the parallel link robot.

Based on the accompanying drawings, a parallel link robot according to an embodiment of the present invention will be described below. FIG. 1 illustrates a perspective view of the parallel link robot according to the embodiment. FIG. 2 illustrates a plan view. FIG. 3 illustrates a side view.

As illustrated in FIG. 1, the parallel link robot according to the embodiment includes a base 1, a movable portion 2, three link portions 5 for connecting the base 1 and the movable portion 2, and three linear actuators 6 for driving the three link portions 5. The movable portion 2 has three degrees of freedom. The base 1 is housed in a housing (not shown) of the parallel link robot. By causing the three linear actuators 6 to operate, the movable portion 2 performs translational movements parallel to the base 1 in directions of X, Y, and Z. The translational movement refers to a movement of the movable portion 2 with all imaginary lines fixed to the movable portion 2 are kept parallel to their original orientations. As will be described later, by providing six linear actuators 6 and six link portions 5, it is possible to impart six degrees of freedom to the movable portion 2. An end effector (not shown) for carrying out a predetermined operation is mounted to a lower face of the movable portion 2. If the end effector is a grasping portion, a tool, and the like, it is possible to carry out various operations such as installation of electronic parts onto a board, assembly of machine parts, processing of machine parts, transfer of products, and packing of the products in boxes, for example.

The base 1 is formed in a shape of a hexagonal plate in a plan view, for example. The three linear actuators 6 are radially disposed on the base 1 at equal intervals of 120° in a circumferential direction. Centerlines of the three linear actuators 6 intersect each other at a center of the base 1 to form central angles of 120° (refer to FIG. 2). The respective linear actuators 6 are supported on the base 1 to be rotatable about axes of rotary shafts 9a and 9b which are predetermined axes. A pair of parallel receiving plates 11a and 11b is connected to the base 1 to correspond to each of the linear actuators 6. The rotary shafts 9a and 9b of the linear actuator 6 are rotatably supported on the paired receiving plates 11a and 11b with bearings interposed therebetween. Three axes A1 of the three linear actuators 6 exist in the same plane parallel to an upper face of the base 1. In a top view of the parallel link robot, the axis A1 of the rotary shafts 9a and 9b of the linear actuator 6 is orthogonal to a center line C1 of the linear actuator 6 (refer to FIG. 2). From three sides of the base 1, cantilever link support beams 1a protrude. On a tip end of each of the link support beams 1a, a driving link 3 of the link portion 5 is rotatably supported. To the tip end of the link support beam 1a, a rotary shaft 13 is connected. The rotary shaft 13 horizontally protrudes to the left and right from the tip end portion of the link support beam 1a. The driving link 3 rotates about an axis A2 of the rotary shaft 13 which is a predetermined axis. In a top view of the parallel link robot, the axis A2 of the rotary shaft 13 is orthogonal to the center line C1 of the linear actuator 6 (refer to FIG. 2).

As illustrated in FIG. 1, each of the linear actuators 6 includes a substantially rectangular parallelepiped main body portion 8 and a shaft portion 7 which moves linearly relative to the main body portion 8 in a direction of the center line. The rotary shafts 9a and 9b are connected to side faces of the main body portion 8. Into the main body portion 8, a ball screw nut to be engaged with a thread groove formed on an outer peripheral face of the shaft portion 7 and a stepping motor, for example, as a motor for driving the ball screw nut for rotation about a center line of the shaft portion 7 are mounted. The stepping motor is a motor having a function of rotating a certain angle in proportion to the number of given pulses. When the stepping motor rotates the ball screw nut, the shaft portion 7 moves linearly in the direction of the center line. The stepping motor is connected to driver for controlling an amount of linear movement of the shaft portion 7. To a tip end of the shaft portion 7, a holder 7a for retaining a connecting shaft 15 of the linear actuator 6 to be connected to the driving link 3 is attached. Because the three linear actuators 6 have the same structures, they are provided with the same reference signs and will not be described.

At the base 1, the three link portions 5 are radially disposed at equal intervals of 120° in a circumferential direction. The center lines C2 of the driving links 3 of the three link portions 5 are disposed on the same straight lines as the center lines C1 of the three linear actuators 6 (refer to FIG. 2).

As illustrated in FIG. 1, each of the link portions 5 includes the driving link 3 connected to the linear actuator 6 and a driven link 4 connecting the driving link 3 and the movable portion 2. A link length of the driving link 3 is shorter than a link length of the driven link 4. The driving link 3 includes paired separate links 3a and 3b separate from each other. The driven link 4 includes paired parallel links 4a and 4b having equal link lengths and parallel to each other. The respective parallel links 4a and 4b are connected to the respective separate links 3a and 3b.

One separate link 3a of the paired separate links is rotatably supported on one rotary shaft 9a of the rotary shafts protruding to the left and right from the link support beam 1a and the other separate link 3b of the paired separate links is rotatably supported on the other rotary shaft 9b of the rotary shafts protruding to the left and right from the link support beam 1a in such a manner that the link support beam 1a of the base 1 is sandwiched between the paired separate links 3a and 3b. As illustrated in FIG. 3, in a side view of the parallel link robot, the separate links 3a and 3b are formed in L shapes and include short-side pieces 3a1 and 3b1 and long-side pieces 3a2 and 3b2 orthogonal to the pieces 3a1 and 3b1 (refer to FIG. 3). To the short-side pieces 3a1 and 3b1 of the separate links 3a and 3b, the shaft portions 7 of the linear actuators 6 are rotatably connected.

To the long-side pieces 3a2 and 3b2 of the separate links 3a and 3b, the parallel links 4a and 4b are rotatably connected.

As illustrated in FIG. 1, the rotary shaft 13 is inserted into the separate links 3a and 3b with bearings interposed therebetween. The separate links 3a and 3b are rotatable only about the axis A2 of the rotary shaft 13 and swing in an imaginary plane perpendicular to the base 1. The connecting shaft 15 of the linear actuator 6 is inserted into the separate links 3a and 3b with bearings interposed therebetween. The paired separate links 3a and 3b can synchronously swing in the imaginary plane perpendicular to the base 1.

The parallel links 4a and 4b are rotatably connected to the separate links 3a and 3b with spherical bearings 21a and 21b, which are ball joints, interposed therebetween. The spherical bearings have three degrees of freedom and the parallel links 4a and 4b are rotatable relative to the separate links 3a and 3b about an x-axis, a y-axis, and a z-axis. In place of the spherical bearings, Cardan joints may be used.

To lower end portions of the parallel links 4a and 4b, the movable portion 2 is connected with spherical bearings 22a and 22b, which are joints, interposed therebetween. The spherical bearings 22a and 22b have three degrees of freedom and the parallel links 4a and 4b are rotatable relative to the movable portion 2 about the x-axis, the y-axis, and the z-axis. In place of the spherical bearings 22a and 22b, Cardan joints may be used. The paired parallel links 4a and 4b are connected to one side of the triangular movable portion 2. The paired parallel links 4a and 4b have equal lengths and a parallelogram is formed by the paired parallel links 4a and 4b, the spherical bearings 21a and 21b, and the spherical bearings 22a and 22b. Even if the movable portion 2 moves, the parallelogram is maintained. Therefore, the movable portion 2 carries out the translational movements in the directions of the x-axis, the y-axis, and the z-axis relative to the base 1.

Figure 4:
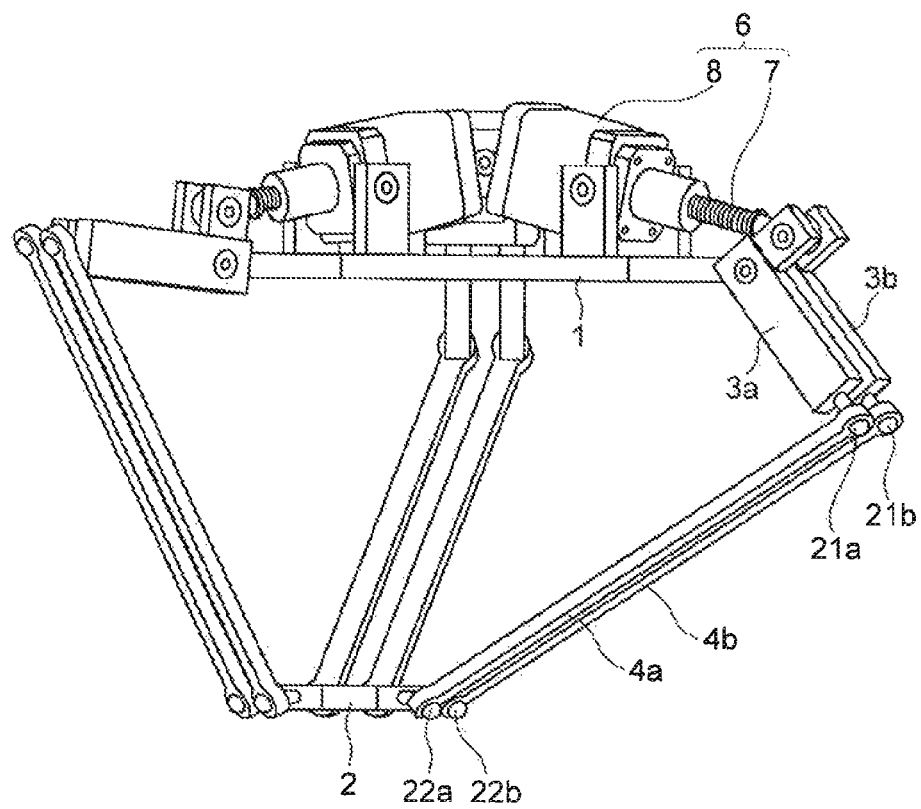
FIG. 4 illustrates a side view of the parallel link robot (with a movable portion performing a translational movement in a horizontal direction).

If the linear actuator 6 is extended and contracted (i.e., the shaft portion 7 is reciprocated) and the shaft portion 7 pushes and pulls the driving link 3, the driving link 3 rotates about the rotary shaft 13. If the driving link 3 rotates about the rotary shaft 13, the movable portion 2 connected to the driving link 3 through the driven link 4 interposed therebetween performs the translational movements relative to the base 1 in the directions of the x-axis, the y-axis, and the z-axis. FIG. 4 shows a state in which the movable portion in FIG. 3 is moved in a horizontal direction.

The drivers for controlling the stepping motors of the three linear actuators 6 are classified into one master driver and two slave drivers. A host controller sends a command only to the master driver. The master driver receives the command sent from the host controller and sends the command to the slave drivers. The slave drivers receive the command sent from the master driver. The master driver and the slave drivers execute the command and synchronous control of the three stepping motors is achieved. Instead of carrying out the master-slave control, the host controller may send the command to the three drivers.

The movable portion 2 is provided with an attitude control mechanism for changing an attitude of the end effector, if needed. The attitude control mechanism has a rotary unit for rotating the end effector about at least one of the x-axis, the y-axis, and the z-axis, for example, and changes the attitude of the end effector comprising the grasping unit, for example. The drivers for controlling the rotary unit and the grasping unit are preferably mounted to the movable portion 2. If the command from the host controller is sent to the drivers through wireless communication, wiring for the drivers on the movable portion 2 becomes unnecessary.

The parallel link robot according to the embodiment exerts the following effects.

As illustrated in FIG. 1, each of the linear actuators 6 and each of the driving links 3 are supported on the base 1 to be rotatable about the rotary shafts 9a, 9b, and 13. By extending and contracting the linear actuator 6, the driving link 3 rotates about the rotary shaft 13. Therefore, the external force applied to the movable portion 2 is converted into a force in the direction of the center line of the linear actuator 6 and acts on the linear actuator 6. Because the ball screw having a high reduction ratio is mounted into the linear actuator 6, the linear actuator 6 can bear the large external force applied to the movable portion 2. Therefore, the rigidity of the parallel link robot is increased. Moreover, because the driving link 3 is supported on the base 1 to be rotatable about the rotary shaft 13, part of the external force applied to the movable portion 2 can be received by the base 1. By the part of the external force applied on the movable portion 2, received by the base 1, the external force acting on the linear actuator 6 reduces and therefore it is possible to reduce the linear actuator 6 in size and eventually the entire parallel link robot in size.

As illustrated in FIG. 2, because the center lines C1 of the three linear actuators 6 are radially disposed on the base 1 at equal intervals in the circumferential direction and the center lines C2 of the three respective driving links 3 are respectively disposed on the same straight lines as the center lines C1 of the three respective linear actuators 6, it is possible to prevent application of unreasonable forces on the linear actuators 6.

As illustrated in FIG. 3, because the length of the driving link 3 from the rotary shaft 13 to the connecting shaft 15 of the linear actuator 6 is shorter than the length of the driven link 4 from the rotary shaft 13 to the spherical bearings 21a and 21b, it is possible to increase an amount of movement of the driven link 4, i.e., to broaden the range of movement of the movable portion 2, even if stroke of the linear actuator is small.

As illustrated in FIG. 1, because the driving link 3 is formed by the paired separate links 3a and 3b which synchronously rotate about the rotary shaft 13, it is easy to connect the paired parallel links 4a and 4b to the driving link 3 with the spherical bearings 21a and 21b interposed therebetween.

The present invention is not limited to a form embodied as the parallel link robot according to the above embodiment and can be changed into various embodiments without departing from the gist of the present invention.

For example, although the three linear actuators and the three link portions are provided to the base and the movable portion is caused to perform the translational movements about the three axes in the above embodiment, six linear actuators and three link portions may be provided to the base to thereby cause the movable portion to perform the translational movements about the three axes and rotation about the three axes.

Although the driving link is formed by the paired separate links separate from each other in the embodiment, the paired separate links may be connected by a connecting rod or the like.

The present specification is based on Japanese Patent Application No. 2011-267888 filed on Dec. 7, 2011 which is incorporated herein.

REFERENCE SIGNS LIST

1 . . . base, 2 . . . movable portion, 3 . . . driving link, 3a, 3b . . . separate links, 4 . . . driven link, 4a, 4b . . . parallel links, 5 . . . link portion, 6 . . . linear actuator, 7 . . . shaft portion, 8 . . . main body portion, 9a, 9b . . . rotary shafts, 13 . . . rotary shaft, 15 . . . connecting shaft, A1 . . . axis of linear actuator, A2 . . . axis of driving link, C1 . . . center line of linear actuator, C2 . . . center line of driving link

The invention claimed is:

1. A parallel link robot comprising:

a base;

a movable portion;

three link portions connecting the base and the movable portion; and three actuators for driving the three link portions, wherein each of the three actuators is a linear actuator supported on the base to be rotatable about a predetermined axis and has a main body portion and a shaft portion for linearly moving relative to the main body portion, each of the three link portions has a driving link supported on the base to be rotatable about a predetermined axis and connected to the linear actuator and a driven link connecting the driving link and the movable portion, the driven link has paired parallel links connected to the driving link via a joint and connected to the movable portion via a joint, the paired parallel links have equal lengths with each other and a deformable parallelogram is formed by the paired parallel links so that the movable portion carries out a translational movement in directions of an x-axis, a y-axis, and a z-axis relative to the base, when the linear actuator extends and contracts, the driving link rotates relative to the base about the predetermined axis of the driving link and the movable portion carries out the translational movement relative to the base in the directions of the x-axis, the y-axis, and the z-axis, center lines of the three linear actuators extending in a radial direction and are radially disposed at equal intervals in a circumferential direction of the base, and respective center lines of the three driving links and the respective center lines of the three linear actuators are disposed along the same plane.

2. The parallel link robot according to claim 1, wherein a length of the driving link from the predetermined axis to a position of connection between the linear actuator and the driving link is shorter than a length of the driving link from the predetermined axis to a position of connection between the driving link and the driven link.

3. The parallel link robot according to claim 2, wherein each of the three driving links has paired separate links.

4. The parallel link robot according to claim 1, wherein each of the three driving links has paired separate links.

* * * * *